United States Patent [19]

Larrive

[11] Patent Number: 4,492,662
[45] Date of Patent: Jan. 8, 1985

[54] MANUFACTURE OF INSULATED ELECTRIC CABLES

[75] Inventor: Christopher Larrive, Southampton, England

[73] Assignee: Pirelli General plc, London, England

[21] Appl. No.: 489,475

[22] Filed: Apr. 28, 1983

[51] Int. Cl.³ .............................................. B29F 3/10
[52] U.S. Cl. .................................. 264/40.1; 264/40.7; 264/174; 264/236; 264/347; 425/71; 425/113; 425/135; 425/383; 425/445
[58] Field of Search .............. 264/236, 174, 347, 40.1, 264/40.7; 425/113, 383, 71, 135, 384, 445

[56] References Cited

U.S. PATENT DOCUMENTS

| | | | |
|---|---|---|---|
| 1,689,205 | 10/1928 | Lamplough | 425/113 |
| 2,678,838 | 5/1954 | Richardson et al. | 425/383 |
| 2,678,839 | 5/1954 | Richardson et al. | 425/383 |
| 3,868,436 | 2/1975 | Ootsuji et al. | 264/174 |
| 3,966,387 | 6/1976 | Babbin et al. | 425/445 |
| 3,982,873 | 9/1976 | Graeber et al. | 425/445 |
| 4,247,271 | 1/1981 | Yonekura et al. | 264/347 |
| 4,416,601 | 11/1983 | Hasegawa et al. | 264/236 |

FOREIGN PATENT DOCUMENTS

| | | | |
|---|---|---|---|
| 2528232 | 1/1977 | Fed. Rep. of Germany | 264/174 |
| 50-40433 | 12/1975 | Japan | 264/174 |
| 1408947 | 10/1975 | United Kingdom . | |
| 1421109 | 1/1976 | United Kingdom . | |
| 2017714A | 10/1979 | United Kingdom . | |

Primary Examiner—Jeffery Thurlow
Attorney, Agent, or Firm—Brooks, Haidt, Haffner & Delahunty

[57] ABSTRACT

In curing an extruded insulation layer of an electric cable by passing the cable through a catenary curing tube, a cable restraining device 8 is disposed at or just prior to the exit end of the catenary tube 11 and serves to apply to the cable 10 a restraint to oppose forces (developed by the hydrostatic pressure of the curing fluid) which tend to extrude the cable through the exit end of the curing tube. In the example shown, the device 8 comprises a set of resiliently flexible cones 9 and a clamping arrangement 12, 13 which is adjustable to adjust the degree of restraints.

16 Claims, 8 Drawing Figures

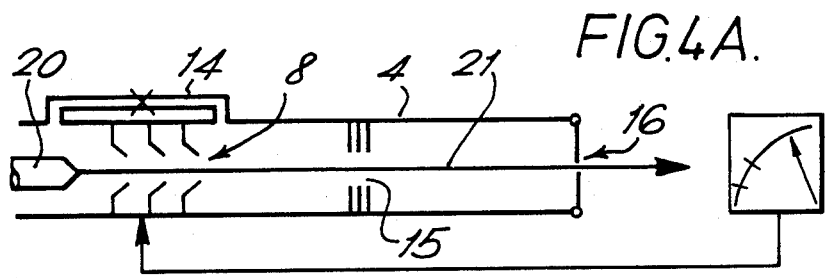
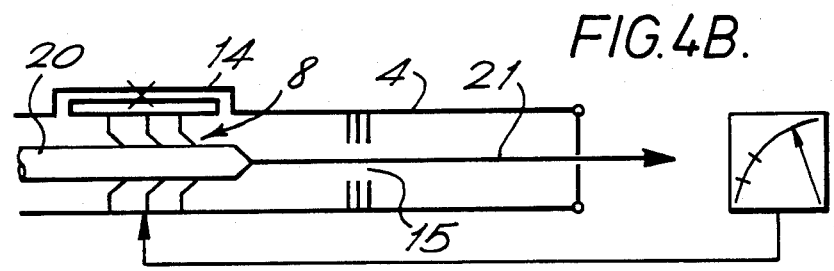
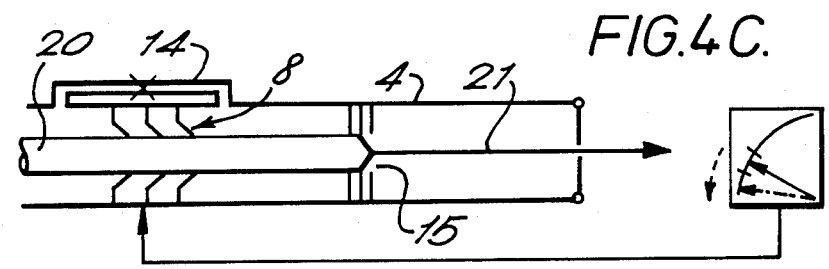
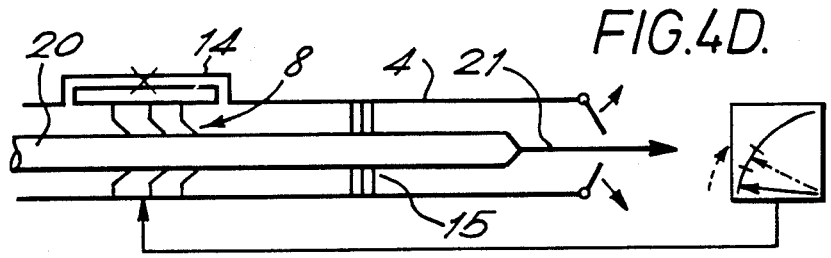

MANUFACTURE OF INSULATED ELECTRIC CABLES

This invention concerns improvements in or relating to the manufacture of insulated electric cables, and more particularly concerns the manufacture of insulated cables by a process wherein an extruded cable insulation layer is cured, that is to say vulcanized or chemically cross-linked, by the application of heat during passage of the cable through a tubular enclosure formed at least in part as a catenary.

As is well known the use of such a catenary-shaped curing enclosure enables the insulation of the cable to be cured from a relatively soft and plastic state as it exits from the extruder head at one end of the catenary to a relatively firm and rigid state at the opposite end without there being any requirement to contact the insulation with supporting or guiding means at any intermediate location, the cable simply being suspended between spaced apart locations so as to hang in a catenary generally coaxial with the catenary-shaped curing enclosure. Means are generally provided for controlling the catenary position of the cable within the curing enclosure to ensure that the still plastic cable insulation does not come into contact with the wall of the curing enclosure and is not damaged thereby, such means comprising for example a catenary position sensor within the curing enclosure coupled to control the catenary tension in the cable by control of the speed operation of a cable haul off means external of the curing enclosure.

In the operation of such an apparatus using a fluid, liquid or gas, within the curing enclosure as a medium for applying the required heat to the insulation, a difficulty arises on account of the hydrostatic pressure of the curing fluid upon the cable which, by virtue of the pressure differential between the inside and the outside of the curing enclosure at the exit end of the catenary tube, tends to extrude the cable through the exit seal customarily provided at the exit end of the enclosure. The tension applied to the cable externally of the curing enclosure, that is to say the tension applied by the haul off means for example, thus is not the same as the tension experienced by the cable within the curing enclosure, and under certain operating conditions, for example wherein the cable has light-weight conductor(s) and a large body of insulation and the curing fluid is relatively dense, the situation can arise that the extrusion force developed upon the cable at the exit end of the curing enclosure exceeds the normally required external tension leading to a loss of control of the cable catenary position within the curing enclosure with attendant risk of damage to the cable insulation.

To avoid or at least substantially reduce the risks attendant upon the abovementioned problem, the present invention proposes the provision of a cable restraining means at the exit end of the catenary curing tube, or adjacent thereto within the tube, for applying to the cable a restraint directed oppositely to the forces (developed by the hydrostatic pressure of the curing fluid) which tend to extrude the cable through the exit end of the catenary curing tube so as to nullify the disadvantageous affects of such forces.

Various means of applying such a restraint to the cable are possible, particularly having regard to the fact that in the region of the exit end of the catenary tube the cable insulation will be virtually cured and is much less susceptible to damage. Thus the restraining means might for example comprise braked caterpillars acting on the cable, braking rollers or wheels, or other frictional devices. Ideally the restraining means will be adjustable for accommodating different or varying cable dimensions, and will be operable not only to nullify the effects of the hydrostatic forces developed upon the cable but also to provide an excess restraining force against which the cable tension control means can operate.

The presently preferred form of restraining means comprises a plurality of generally flexible and resilient conical members which are nested with each other and are arranged coaxially of the catenary tube, the conical members each being open at its apex for passage therethrough of the cable and the nested array of conical members being subject selectively to the action of a pressure collar which can be urged axially against the conical members so as by a degree of distortion thereof to vary the restraining effect of the conical members upon a cable traversing their open apices. The action of the pressure collar can advantageously be made dependant upon the sensed tension applied to the cable externally of the curing enclosure.

The invention, together with features and advantages thereof, will best be appreciated from consideration of the following description of exemplary embodiments given with reference to the accompanying drawings wherein:

FIGS. 4A to 4D show the sequence of operations involved in setting up a catenary curing tube incorporating a restraining means as in FIG. 2.

Figure 1:
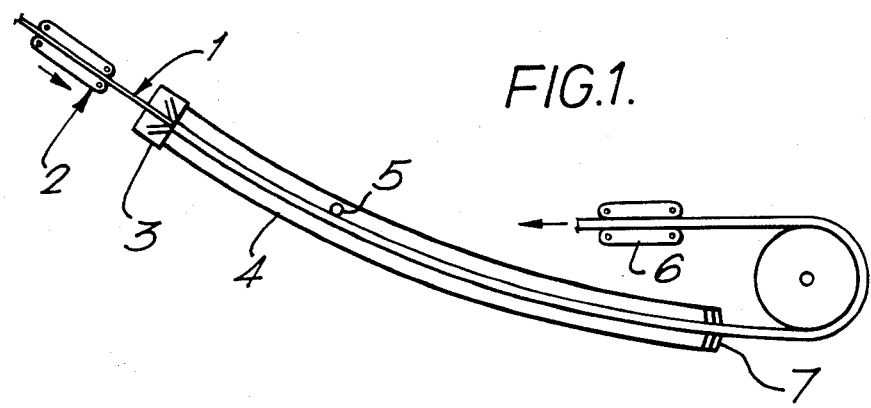
FIG. 1 is a schematic showing of a plant for extruding insulation onto a cable core and for curing the extruded material in a catenary tube.

Referring to FIG. 1, a cable core 1 is fed by metering caterpillar device 2 through the cross head 3 of an extruder where a layer of elastomeric insulation is extruded continuously onto the cable core 1. The outlet of the extruder leads directly into the inlet end of a catenary shaped curing tube 4 which, in operation, contains hot fluid under a predetermined pressure. As shown, the cable follows a catenary path through the catenary tube 4, its position within the catenary tube being controlled through a detector 5 which determines the operating speed of a haul-off caterpillar 6 to determine the tension in the cable. The exit end of the catenary tube 4 is sealed by means of a sealing arrangement 7.

Figure 2:
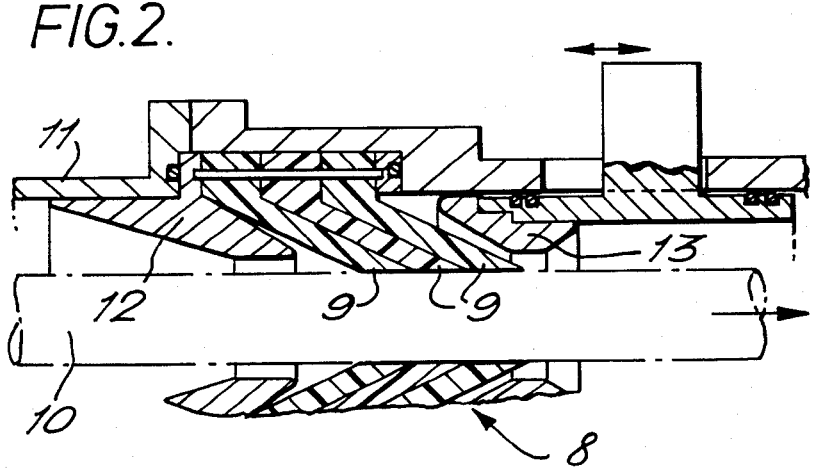
FIG. 2 is a fragmentary sectional view showing a restraining means embodying the present invention.

FIG. 2 shows a fragmentary sectional view of a restraining means 8, embodying the invention, fitted within the bore of a catenary curing tube such as that designated 4 in FIG. 1. The restraining means 8 comprises a set of frusto-conical members 9 nested or stacked together as shown and defining by their aligned open apices a through passage for the cable 10. The members 9 are formed of rubber, natural or synthetic depending upon the temperatures to which they are to be subjected, and are selected to be of a size nominally to suit the dimensions of the cable 10. The members 9 are securely clamped to the wall 11 of the catenary tube 4, and are arranged to be subject to the action of a pair of pressure rings or collars 12, 13 the former 12 of which is secured to the catenary tube and the latter 13 of which is movable axially of the catenary tube. As will be appreciated, movement of pressure collar 13 towards the left (as viewed in FIG. 2) will cause a deformation of the members 9 such as to cause them to grip more strongly the cable 10, whereas the opposite movement will reduce the restraining effect of the members 9.

Figure 3:
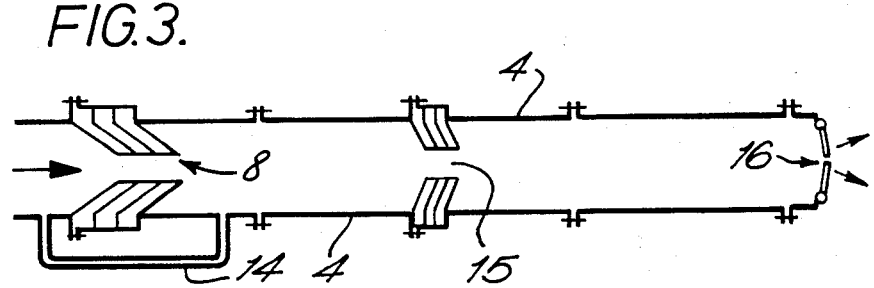
FIG. 3 shows the restraining means of FIG. 2 installed near to the exit end of a catenary tube.

FIG. 3 is an exemplary showing of the restraining means 8 of FIG. 2 installed adjacent to the exit end of a catenary curing tube 4. A pressure bypass 14 is provided around the restraining means 8, and there is also provided downstream of the restraining means 8 a pneumatic seal 15 and a quick release hawser seal 16. FIGS. 4A to 4D show the sequence of operations involved in setting up a catenary vulcanization line such as that of FIG. 3. In FIG. 4A, the cable start 20 is pulled through the catenary tube 4 with a small diameter hawser 21 which gives rise only to a very small hydrostatic force acting at the quick release seal 16. Under these conditions, the sensed haul off tension is relatively high and this causes the pressure collar 13 (FIG. 2) of the restraining means 8 to be adjusted towards the right so as to minimize the action of the restraining means 8 and permit relatively free passage of the cable start 20. FIG. 4B shows the cable start 20 engaged with the restraining means 8, but otherwise the conditions are as for FIG. 4A since the restraining means 8 is bypassed by bypass line 14. When, as shown in FIG. 4C, the cable start 20 plugs the seal 15, the pressure between seal 15 and hawser seal 16 reduces towards atmospheric and the hydrostatic force developed upon the cable by virtue of the pressure of the curing medium increases dramatically. The haul off tension of the cable drops correspondingly, and in response to this fall, the restraining means 8 is actuated by corresponding leftwards movement of pressure collar 13. In FIG. 4D, the hawser seal 16 has opened preparatory to the cable start 20 exiting from the catenary tube, and the restraining device 8 adopts a normal operating condition where, in dependence upon varying haul off tension, it applies to the cable a variable restraining action.

Figure 5:
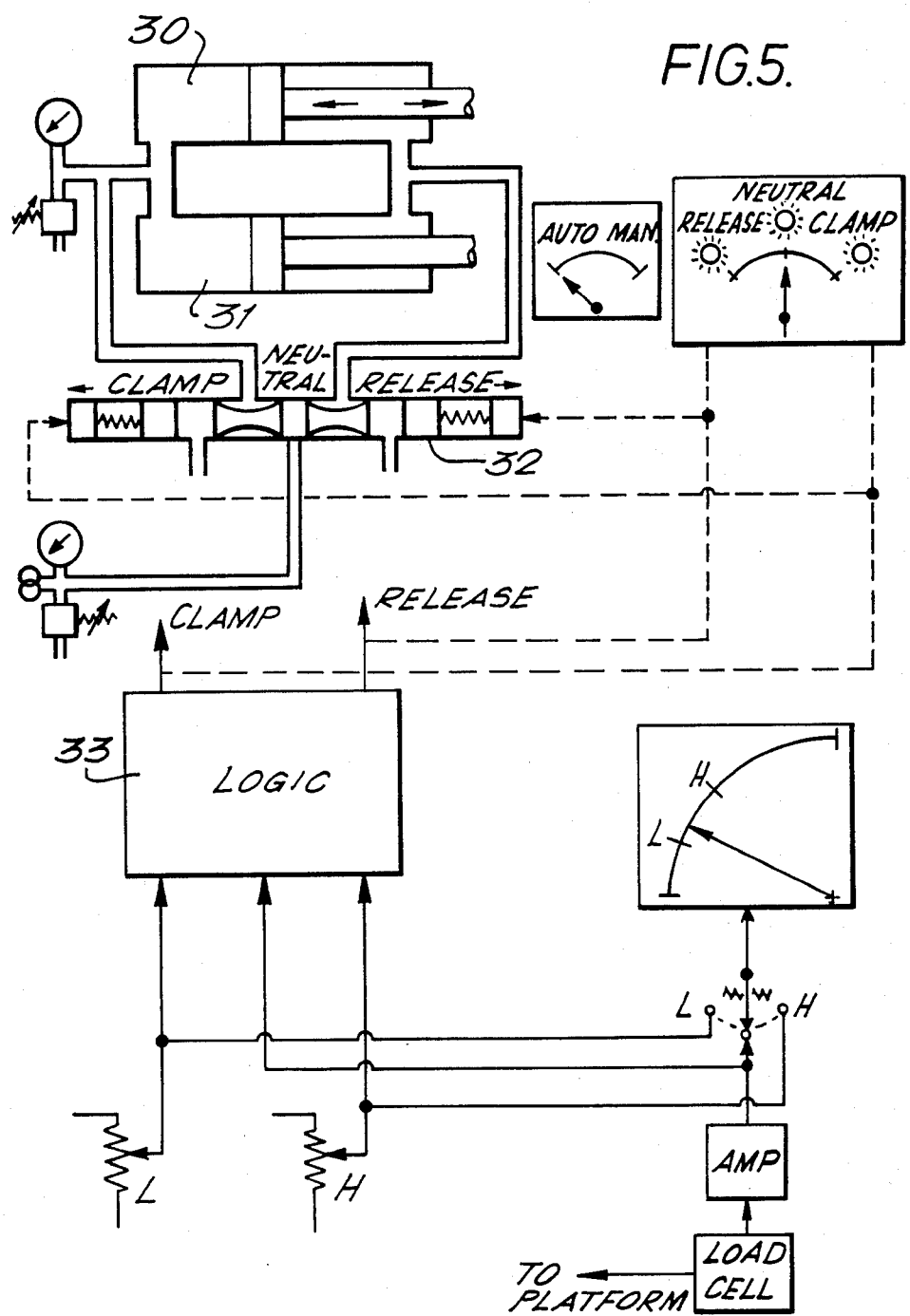
FIG. 5 represents a control system for adjusting the restraining means of FIG. 2 according to variations in take-off tension.

FIG. 5 shows a control system for adjusting the restraining means 8 of FIG. 2 according to variations in the sensed haul-off tension. The rubber cones 9 of the restraining means 8 are compressed in order to provide the required braking force by means of a pair of hydraulic cylinders 30, 31. The degree of compression, and hence the magnitude of the braking force, is determined by the displacement of these cylinders. This displacement is determined by a three position hydraulic valve 32 providing a clamping, a neutral and a releasing mode. This valve is controlled automatically by an electronic logic system 33 fed by a signal from a load cell which monitors the haul off tension via the turn round wheel (FIG. 1). Two set points are selected, a low and a high. If the haul off tension is below the low level the brake 8 is put into clamp until such time as the displacement is sufficient to generate enough braking force to increase the haul off tension to the low level where it will then change to neutral, i.e. no further displacement will take place. Should the cable size increase for a given displacement, the braking force will increase and hence so will the haul off tension; if the tension increases above the high limit the brake will release in a similar manner. This control system is totally independent of the catenary position detector 5 which controls the speed of the haul off device 6.

I claim:

1. Apparatus for curing an extruded insulation layer of an electric cable, comprising a tube for the through-passage of the insulated electric cable, which tube is formed at least in part as a catenary, means for filling said tube with a heated fluid for effecting curing of the cable insulation layer, and cable restraining means at the exit end of the curing tube, or adjacent said exit end and within the curing tube, for applying to the cable insulation a restraining force directed oppositely to forces developed by the hydrostatic pressure of the curing fluid which tend to extrude the cable through the exit end of the curing tube, so as to nullify the effects of such forces, said cable restraining means comprising flexible means in sliding engagement with said cable insulation and adjustable means for pressing said flexible means toward said cable and thereby varying the restraining force on said cable.

2. Apparatus as claimed in claim 1, comprising means for sensing and controlling the tension on the cable at a point downstream of the curing tube, and connected to said adjustable means for controlling said cable restraining means and thereby to adjust said restraining force to stabilise said tension.

3. Apparatus as claimed in claim 2, in which said tension and controlling means causes said cable restraining means to apply an intermediate restraining force when the sensed tension is between predetermined low and high levels, to apply a high restraining force when the sensed tension is below said low level, and to apply low restraining force when the sensed tension is above said high level.

4. Apparatus as set forth in claim 2 wherein said tension and controlling means comprises tension measuring means downstream of the exit end of the curing tube responsive to the tension on said cable as it leaves the curing tube.

5. Apparatus as set forth in claim 2 further comprising sealing means downstream of the cable restraining means and engageable with the cable for sealing the cable with respect to the curing tube.

6. A method of curing an extruded insulation layer of an electric cable, comprising passing the insulated electric cable along a catenary path through a curing tube which conforms generally to said catenary path, filling said curing tube with a heated fluid for effecting curing of the cable insulation layer, applying to the cable, at the exit end of the curing tube or adjacent said exit end and within the curing tube, a restraining force applied by sliding friction to the cable and opposing the forces developed by the hydrostatic pressure of the curing fluid which tend to extrude the cable through the exit end of the curing tube, and varying said frictional restraining force as the cable is passed through the curing tube so as to nullify the effects of the forces developed by the hydrostatic pressure of the curing fluid.

7. A method as claimed in claim 6, comprising sensing the tension within the cable at a point downstream of the curing tube and adjusting said restraining force accordingly, so as to stabilise said tension.

8. Apparatus as claimed in claim 1, in which said flexible means comprises a plurality of generally flexible and resilient conical members which are nested with each other and arranged coaxially of the curing tube, the conical members each being open at its apex for passage therethrough of the cable, and in which said adjustable means is a pressure collar with means for selectively urging said pressure collar axially against the conical members so as by a degree of distortion thereof to vary the restraining effect of the conical members upon the passing cable.

9. Apparatus as claimed in claim 2, in which said flexible means comprises a plurality of generally flexible and resilient conical members which are nested with each other and arranged coaxially of the curing tube, the conical members each being open at its apex for passage therethrough of the cable, and in which said adjustable means is a pressure collar with means for selectively urging said pressure collar axially against the conical members so as by a degree of distortion thereof to vary the restraining effect of the conical members upon the passing cable.

10. Apparatus as claimed in claim 3, in which said flexible means comprises a plurality of generally flexible and resilient conical members which are nested with each other and arranged coaxially of the curing tube, the conical members each being open at its apex for passage therethrough of the cable, and in which said adjustable member is a pressure collar with means for selectively urging said pressure collar axially against the conical members so as by a degree of distortion thereof to vary the restraining effect of the conical members upon the passing cable.

11. Apparatus as claimed in claim 1, further comprising a detector for sensing the position of the cable catenary within said curing tube and controlling accordingly the speed of a haul off device for the cable, tending to stabilise the position of the cable catenary.

12. Apparatus as claimed in claim 2, further comprising a detector for sensing the position of the cable catenary within said curing tube and controlling accordingly the speed of a haul off device for the cable, tending to stabilise the position of the cable catenary.

13. Apparatus as claimed in claim 3, further comprising a detector for sensing the position of the cable catenary within said curing tube and controlling accordingly the speed of a haul off device for the cable, tending to stabilise the position of the cable catenary.

14. Apparatus as claimed in claim 8, further comprising a detector for sensing the position of the cable catenary within said curing tube and controlling accordingly the speed of a haul off device for the cable, tending to stabilise the position of the cable catenary.

15. Apparatus as claimed in claim 9, further comprising a detector for sensing the position of the cable catenary within said curing tube and controlling accordingly the speed of a haul off device for the cable, tending to stabilise the position of the cable catenary.

16. Apparatus as claimed in claim 10, further comprising a detector for sensing the position of the cable catenary within said curing tube and controlling accordingly the speed of a haul off device for the cable, tending to stabilise the position of the cable catenary.

* * * * *